Patented Aug. 28, 1934

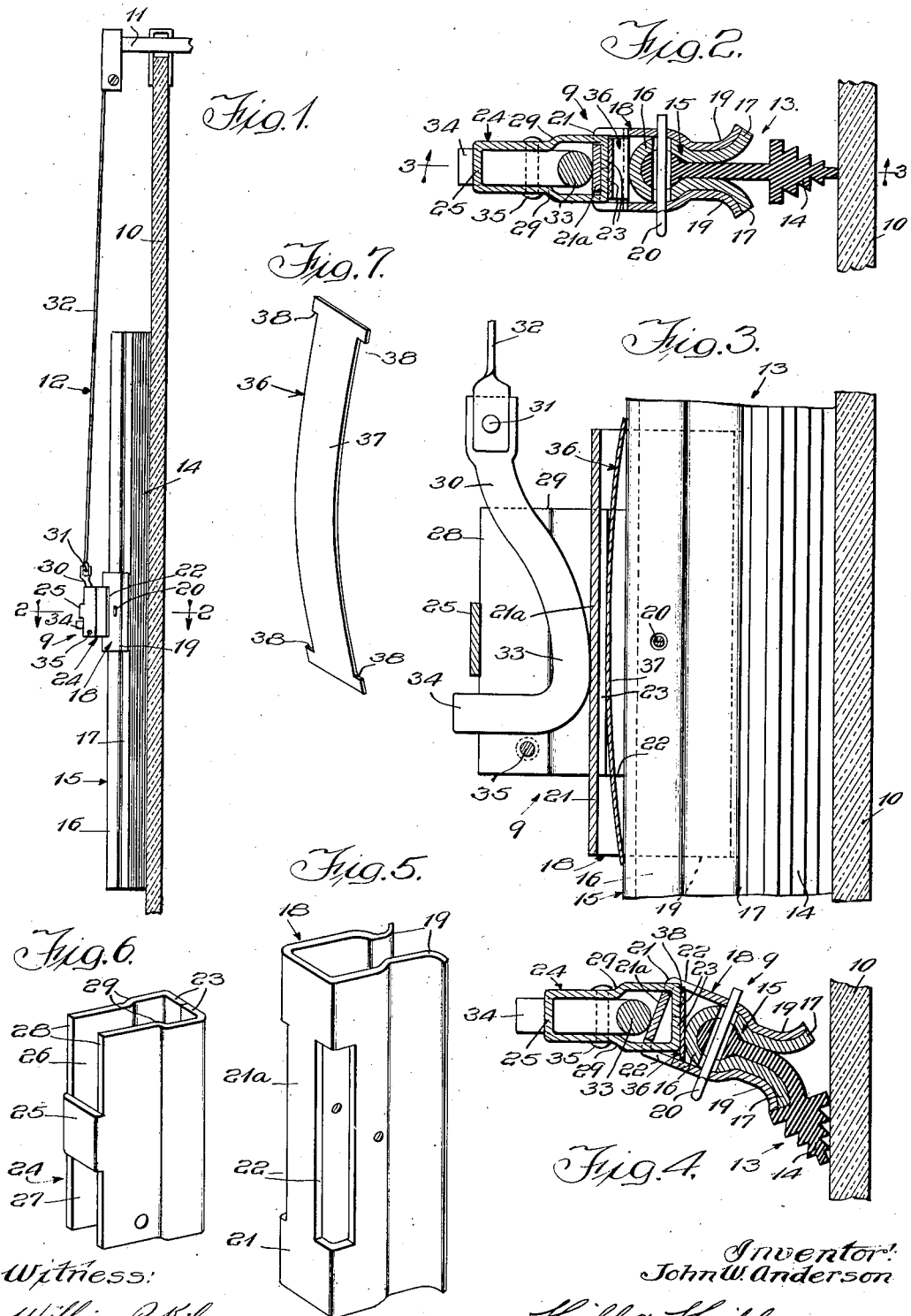

1,971,893

UNITED STATES PATENT OFFICE 1,971,893

WINDSHIELD WIPER

John W. Anderson, Gary, Ind.

Application December 17, 1930, Serial No. 502,935

16 Claims. (Cl. 15—250)

This invention relates to windshield wipers, and particularly to means for connecting the wiper blade to the arm by which the blade is moved across the surface of the windshield.

One object of the present invention is to provide a construction and arrangement wherein the wiper blade is hingedly mounted with respect to the wiper arm and operating shaft in a manner to oscillate about a plurality of substantially parallel center lines of rotation spaced apart from each other.

Another object of the invention is to provide a wiper blade connector having means associated therewith for urging the wiper blade and parts of the connector into substantial alignment and toward a perpendicular position with respect to the surface of the windshield.

Another object of the invention is to provide wiper blade connector means for connecting a wiper blade to its operating shaft, and having means associated therewith for assisting in changing the angularity of the wiper blade with respect to the surface of the windshield at each end of the wiping stroke in a manner to eliminate chattering when the direction of movement of the blade is reversed.

Another object of the invention is to provide a wiper blade connector having resilient means associated therewith for cushioning the relative movement of the wiper blade and parts of the connector, thereby avoiding a loose uncontrolled flopping action of the wiper blade at the ends of its stroke and when the direction of movement of the blade is reversed.

Another object of the invention is to provide a wiper blade connector having means associated therewith for urging the wiper blade toward an intermediate or normal position when the wiper is at rest, thereby avoiding the lateral bending strain on the wiping element during its period of non-use.

Another object of the invention is to provide a structure wherein less power is required for operating the wiper and wherein means are provided for relieving excessive friction produced between the wiping element and the surface of the windshield due to partial dryness thereof or other friction producing conditions.

A further object of the invention is to provide a wiper blade connector having resilient means associated therewith to produce a rocking reflex action of the wiper blade at each end of its wiping stroke, thereby providing a quiet smoothly operating device.

A still further object of the present invention is to improve devices of the character described in sundry details hereinafter referred to and particularly pointed out in the appended claims.

One embodiment of the present invention is shown for illustrative purposes in the accompanying drawing in which Fig. 1 is an elevational view of the windshield wiper blade and supporting arm assembly, showing its application to the windshield of a motor vehicle, or the like, and illustrating an embodiment of the present invention associated therewith;

Fig. 2 is an enlarged sectional plan view taken substantially as indicated by the line 2—2 of Fig. 1;

Fig. 3 is a sectional elevation taken substantially as indicated by the line 3—3 of Fig. 2;

Fig. 4 is a sectional view similar to Fig. 2 showing portions of the device in changed positions which they may assume in the operation of the device;

Fig. 5 is an enlarged perspective view of a clip forming one of the elements of the present invention;

Fig. 6 is an enlarged perspective view of a connecting member or hanger forming another element of the invention; and Fig. 7 is a perspective view of a resilient member forming still another element of the present invention.

In the drawing, the wiper blade and arm assembly is indicated as a whole by the reference character 9, and shown in its operative position with respect to a windshield 10 of a motor vehicle, or the like, at the top of which is mounted a wiper blade operating rock shaft 11 to which is connected a supporting or operating wiper arm designated as a whole by the numeral 12, in a manner to position a wiper blade 13 including a flexible wiping element 14 of rubber or other suitable material, in cooperative relationship with the surface of the windshield. The rock shaft 11 may be connected to any suitable operating device (not shown) for oscillating the shaft, and in a manner to move the wiper blade across the surface of the windshield.

In the illustrative embodiment of the present invention, the wiping element 14 is mounted in a holder 15 formed preferably of metal or other suitable material folded, in the present instance, preferably to form a bead portion 16 and a channel or groove, between the legs or wall portion 17 of which the wiping element 14 is secured.

For connecting the wiper blade 13 to the arm 12 and operating shaft 11, a U-shaped clip designated as a whole by the numeral 18 is provided with leg portions 19 adapted to engage opposite sides of the holder 15 in a manner to be secured thereto by means of a bolt or cotter pin 20 extending through apertures formed in the bead portion 16 and the legs 19 of the clip.

The clip 18 is also provided with a bight portion 21 of substantial width spaced from the adjacent face of the bead 16, and formed in said clip adjacent the bight portion 21 are a plurality of spaced oppositely disposed substantially parallel elongated apertures 22 in a manner to leave a strip 21a between the apertures, and connecting the opposite ends of the bight portion 21, the apertures 22 being adapted to receive the in-turned end portions 23 of a connecting member or hanger designated as a whole by the numeral 24 of U-shaped cross section having a bight portion 25 shown in Figs. 1, 3 and 6 as of somewhat lesser longitudinal dimension than the length of the hanger 24 of which it forms a part, thus, providing slots or recesses 26 and 27 at each end of the bight portion 25 between legs 28, the ends 23 of which are bent or turned inwardly, as above described, in a manner to enter the apertures 22 in the clip 18 and be positioned adjacent the bight portion 21 and strip 21a thereof.

The strip 21a formed in the bight portion 21 of the clip 18 between the apertures 22 is of slightly lesser width than the distance between the inner faces of the legs 28 adjacent the end portions 23, and it will be observed that by such an arrangement, the clip 18 and blade 13 connected thereto is permitted to oscillate about the end portions 23, one edge of the strip 21a cooperating with the juncture of one of the end portions 23 and one of the legs 28 of the hanger 24 to provide a fulcrum or center line of rotation for the clip and blade when the arm is oscillated to move the blade across the windshield in one direction as shown in Fig. 4, and the opposite edge of the strip 21a cooperating with the juncture of the other end portion 23 and the other leg 28 of the hanger 24 to provide a fulcrum or center line of rotation for the clip and blade when the arm is oscillated to move the blade across the windshield in the opposite direction. Thus, it will be observed that a plurality of spaced hinge connections are provided between the clip and hanger about which the blade may oscillate during its wiping movements across the surface of the windshield.

The legs 28 of the hanger 24 are shown, in the present instance, as provided with inwardly offset portions as indicated at 29 to provide suitable space between said inwardly offset portions for receiving one portion of the wiper arm 12 in a manner to prevent lateral displacement of the hanger 24 with respect to the arm, the said portion of the wiper arm 12 being shown, in the present instance, as a head 30 secured by means of a bolt 31 to a flexible portion 32 of the arm, the head 30 being bent as indicated at 33 to provide a portion adapted to engage the outer surface of the strip 21a formed on the clip 18, and having an outwardly extending hook portion 34 adapted to be positioned also between the inwardly offset portions 29 of the hanger 24 in a manner to secure the hanger 24 against oscillatory movement with respect to the wiper arm 12 as clearly illustrated in Figs. 2 and 4.

The hanger 24 is provided with a suitably positioned bolt or rivet 35 for retaining the adjacent or abutting edges of the end portions 23 in engagement with each other, and is adapted to engage one side of the portion 34 in a manner to limit longitudinal movement of the hanger 24 with respect to the wiper arm in one direction, while the bight portion 25 of the hanger 24 is adapted to engage the opposite side of the portion 34 in a manner to limit the longitudinal movement of the hanger with respect to the arm in the opposite direction. The space or distance between adjacent faces of the inwardly offset portions 29 formed in the legs 28 of the hanger 24 is preferably substantially equal to the diameter or width of the head 30 and its portion 33 so as to provide suitable engagement with the end portion or head of the wiper arm 12 in a manner to prevent oscillatory and lateral movement of the hanger 24 with respect to the wiper arm 12.

Positioned in the space between the end portions 23 of the hanger 24 and the adjacent face of the bead 16 of the wiper blade 13 is a resilient member designated as a whole by the numeral 36, and shown, in the present instance, as a flat spring having its intermediate portion 37 normally bent as clearly shown in Figs. 3 and 7, and provided adjacent its end portions with laterally extending lugs or shoulders 38 adapted to engage opposite edges of the leg portions 19 of the clip 18 in a manner to prevent longitudinal displacement of the member 36 with respect to the clip. The member 36 is positioned between the wiper blade and portions 23 of the hanger under tension and in a manner to normally exert a force tending to separate the portions 23 and blade 13 thereby urging the blade and attached clip 18 into substantial transverse alignment with the hanger 24, as clearly shown in Fig. 2, but by reason of its resiliency, the member 36 will yield to permit oscillation of the blade and clip around the respective fulcrums or centers of rotation, above referred to, to permit the wiper blade to assume a suitable angular position with respect to the surface of the windshield during the wiping operation in either direction.

It will be observed from the foregoing description that by reason of the force continually exerted between the portions 23 and bead 16 tending to laterally align the blade, clip and hanger, the spring 36 at each end of the wiping stroke will act to bring about such alignment and thereby assist in changing the angularity of the blade with respect to the surface of the windshield each time the direction of movement of the wiper blade and arm is reversed, thus promoting the prompt turning of the wiping element 14 to bring the proper side or face of the element into contact with the surface of the windshield for its return stroke.

It will be observed also that when the wiper blade is parked, usually at one end of its stroke, the spring 36 serves to urge the blade and clip toward substantial alignment as shown in Fig. 2, thereby relieving the wiping element 14 from the lateral bending strain prevalent in windshield wipers at present in use.

It will be observed further that by reason of the assistance rendered by the member 36 in changing the angularity of the blade with respect to the surface of the windshield at the ends of its stroke, the action of the spring eliminates chattering of the blade when reversing its direction of movement, and also, that in changing its angular position with respect to the surface of the windshield, the movement of the blade is cushioned against the resiliency of the spring, thereby preventing a loose uncontrolled flopping action of the blade as is characteristic of present devices.

Frequently when the windshield is slightly or partly dry as may result from a very light rain or fog, there is a tendency for the wiping element 14 to heat due to friction on the windshield, which results in a tendency of the wiping element to adhere or stick to the surface of the windshield and drag heavily thereon, thus increasing the strain on the source of motive power, whether electrically or vacuum operated, employed for operating the wiper. In the use of structures wherein the blade is connected substantially rigidly to the wiper arm during its wiping movement, the friction produced between the wiping element and windshield sometimes becomes sufficient to stall the wiper, whereas, in applicant's device, the resiliency provided by the member 36 in the connection between the wiper blade 15 and arm 12 permits the blade to yield when necessary to overcome any increased friction due to dryness of the windshield or other condition, thereby relieving the motor or other source of power from the effort otherwise required of it to overcome the additional friction, this yielding of the member 36 reduces the strain otherwise thrown on the source of power and permits the continued operation of the wiper and associated elements. It will be observed that by such an arrangement, less power is required for the efficient operation of the wiper.

Obviously, the present invention is not limited to the precise construction and arrangement shown and described as the same may be variously modified within the scope of the claims. Moreover, all the features of the invention need not be used con-jointly as the same may be used to advantage in variously different combinations and sub-combinations.

Having thus described my invention, what I claim as new and desire to cover by Letters Patent is:

1. In a windshield wiper, the combination with a wiper blade, of means for connecting said blade to a wiper arm, said means comprising a clip secured to said blade and having a bight portion spaced from the blade, said clip being provided with longitudinally elongated apertures adjacent said bight portion, and a hanger adapted to be secured to said arm, said hanger having a longitudinally disposed portion thereof positioned loosely in said apertures to provide an elongated hinge connection between said clip and hanger.

2. In a windshield wiper, the combination with a wiper blade, of means for connecting said blade to a wiper arm, said means comprising a clip secured to said blade and having a bight portion spaced from the blade, said clip being provided with elongated apertures adjacent said bight portion, and a hanger adapted to be secured to said arm, said hanger having elongated portions thereof positioned loosely in said apertures and engageable with said bight portion to provide a hinge connection between said clip and hanger.

3. In a windshield wiper, the combination with a wiper blade, of means for connecting said blade to a wiper arm, said means comprising a clip secured to said blade and having a bight portion spaced from the blade, said clip being provided with elongated apertures adjacent said bight portion, a hanger adapted to be secured to said arm, said hanger having a portion thereof positioned loosely in said apertures and extending under said bight portions so as to be engageable with said bight portion to provide a hinge connection between said clip and hanger and means for maintaining the bight engaging portion of said hanger in cooperative relationship with the bight portion of the clip.

4. In a windshield wiper, the combination with a wiper blade, of means for connecting said blade to a wiper arm, said means comprising a clip secured to said blade and having a bight portion spaced from the blade, said clip being provided with elongated apertures adjacent said bight portion, a hanger adapted to be secured to said arm, said hanger having a portion thereof positioned loosely in said apertures and extending under said bight portion so as to be engageable with said bight portion to provide a hinge connection between said clip and hanger, and resilient means for yieldingly maintaining the bight engaging portion of said hanger in cooperative relationship with the bight portion of the clip.

5. In a windshield wiper, the combination with a wiper blade, of means for connecting said blade to a wiper arm, said means comprising a clip secured to said blade and having a bight portion spaced from the blade, said clip being provided with elongated apertures adjacent said bight portion, a hanger adapted to be secured to said arm, said hanger having a portion thereof positioned loosely in said apertures and extending under said bight portion so as to be engageable with said bight portion to provide a hinge connection between said clip and hanger, and resilient means positioned between the clip engaging portion of said hanger and the blade for yieldingly maintaining said engaging portion of the hanger in cooperative relationship with the bight portion of the clip.

6. In a windshield wiper, the combination with a wiper blade, of means for connecting said blade to a wiper arm, said means comprising a U-shaped clip secured to said blade and having a bight portion spaced from the blade, said clip being provided with oppositely disposed longitudinally elongated apertures adjacent said bight portion, and a hanger adapted to be secured to said arm, said hanger having longitudinally disposed portions thereof positioned loosely in said apertures and engageable with said clip to provide an elongated hinge connection between said clip and hanger having a plurality of axes about which said clip may rotate.

7. In a windshield wiper, the combination with a wiper blade, of means for connecting said blade to a wiper arm, said means comprising a U-shaped clip secured to said blade, said clip having a bight portion of substantial width spaced from said blade and provided with oppositely disposed apertures adjacent said bight portion, and a U-shaped hanger adapted to be secured to said arm and having the ends of its leg portions extending loosely through said apertures and cooperable with said bight portion to provide a plurality of spaced substantially parallel axes about which the said clip and hanger are relatively movable.

8. In a windshield wiper, the combination with a wiper blade, of means for connecting said blade to a wiper arm, said means comprising a U-shaped clip secured to said blade, said clip having a bight portion of substantial width spaced from said blade and provided with oppositely disposed apertures adjacent said bight portion, a U-shaped hanger adapted to be secured to said arm and having the ends of its leg portions extending inwardly through said apertures and cooperable with said bight portion to provide a plurality of spaced substantially parallel axes about which the said clip and hanger are relatively movable, and resilient means for yieldingly maintaining said end portions in cooperative relationship with said bight portion.

9. In a windshield wiper, the combination with a wiper blade, of means for connecting said blade to a wiper arm, said means comprising a clip secured to said blade and having a bight portion spaced from the blade, said clip being provided with elongated apertures adjacent said bight portion, a hanger adapted to be secured to said arm, said hanger having a portion thereof positioned loosely in said apertures and extending under said bight portion so as to be engageable with said bight portion to provide a hinge connection between said clip and hanger, a resilient member positioned between the clip engaging portion of said hanger and the blade for yieldingly maintaining said engaging portion of the hanger in cooperative relationship with the bight portion of the clip, and means for securing said resilient member against displacement with respect to said clip.

10. In a windshield wiper, the combination with a wiper blade, of means for connecting said blade to a wiper arm, said means comprising a clip secured to said blade and provided with a bight portion spaced from the blade, said clip having apertures formed therein adjacent said bight portion, a hanger adapted to be connected to said arm and having its end portions positioned in said apertures and extending under said bight portion, a resilient member positioned between said end portions and blade, and means formed on said member and engageable with opposite edges of said clip for securing said member against longitudinal displacement with respect to the clip.

11. In a windshield wiper, the combination with a wiper blade, of means for connecting said blade to a wiper arm, said means comprising a clip secured to said blade and provided with a bight portion of substantial width spaced from said blade, said clip having elongated oppositely disposed apertures formed therein adjacent said bight portion, a U-shaped hanger adapted to be connected to said arm and having its end portions bent inwardly toward each other and positioned in said apertures adjacent said bight portion, an elongated resilient member positioned between said end portions of the hanger and said blade, means formed on said member and engageable with opposite edges of said clip for securing said member against longitudinal displacement with respect to the clip, and means carried by said hanger and engageable with said arm for limiting the longitudinal movement of the hanger with respect to the arm.

12. In a windshield wiper, the combination with a wiper blade, of means for connecting said blade to a wiper arm, said means comprising a clip secured to said blade and provided with a bight portion of substantial width spaced from said blade, said clip having elongated oppositely disposed apertures formed therein adjacent said bight portion, a U-shaped hanger adapted to receive said arm and be connected thereto in a manner to prevent oscillatory movement of the hanger with respect to the arm, said hanger being provided with means cooperable with the arm for limiting endwise movement of the hanger with respect thereto, said hanger having its end portions bent inwardly toward each other and positioned in said apertures adjacent said bight portion and engageable therewith, an elongated resilient member positioned between said end portions and blade for yieldingly maintaining the end portions in engagement with said bight portion, and means formed adjacent the ends of said member and engageable with opposite edges of said clip for securing said member against longitudinal displacement with respect to said clip and hanger.

13. In a windshield wiper, the combination with a wiper blade, of means for connecting said blade to a wiper arm, said means comprising a U-shaped clip secured to said blade, said clip having a bight portion of substantial width spaced from the blade and provided with oppositely disposed apertures adjacent said bight portion, a U-shaped hanger having spaced leg portions adapted to receive a portion of said arm therebetween for preventing lateral displacement of the hanger with respect to the arm, said arm having a laterally extending portion engageable with said leg portions for preventing oscillatory movement of the hanger with respect to the arm, the leg portions of said hanger having their ends turned inwardly toward each other and positioned loosely in said apertures adjacent said bight portion and cooperable therewith to provide a plurality of axes about which the said clip and hanger are relatively movable, and resilient means for yieldingly maintaining said leg ends in cooperative relationship with respect to said bight portion.

14. In a windshield wiper, the combination with a wiper blade, of means for connecting said blade to a wiper arm, said means comprising a U-shaped clip secured to said blade, said clip having a bight portion of substantial width spaced from the blade and provided with oppositely disposed apertures adjacent said bight portion, a U-shaped hanger having spaced leg portions adapted to slidably receive a portion of said arm therebetween for preventing lateral displacement of the hanger with respect to the arm, said arm having another portion engageable with said leg portions for preventing oscillatory movement of the hanger with respect to the arm, means associated with said hanger and engageable with said other portion of the arm for limiting the sliding movement of the hanger longitudinally with respect to the arm, the leg portions of said hanger having their ends turned inwardly toward each other and positioned loosely in said apertures adjacent said bight portion and cooperable therewith to provide a hinge connection between said clip and hanger, and resilient means positioned between said leg ends and said blade for yieldingly maintaining the leg ends in cooperative relationship with respect to said bight portion.

15. In a windshield wiper, the combination with a wiper blade, of means for connecting said blade to a wiper arm, said means comprising a U-shaped clip secured to said blade and having a bight portion spaced from the blade, said clip being provided with elongated apertures at opposite sides thereof, and a hanger adapted to be secured to said arm, said hanger having elongated portions thereof positioned loosely in said apertures to provide a hinge connection between said clip and hanger, said hinge connection having a plurality of spaced substantially parallel axes about which said clip may rotate.

16. In a windshield wiper, the combination with a wiper blade, of means for connecting said blade to a wiper arm, said means comprising a clip having opposite side portions secured to said blade and having a bight portion spaced from the blade, said clip being provided with elongated apertures in said opposite side portion, a hanger adapted to be secured to said arm, said hanger having clip engaging portions positioned loosely in said apertures to provide a plurality of spaced axes about which the said clip and hanger may rotate, and resilient means operatively related to said clip engaging portions of the hanger for yieldingly maintaining the said engaging portions of the hanger in cooperative relationship with said clip.

JOHN W. ANDERSON.